US008261294B2

(12) United States Patent  (10) Patent No.: US 8,261,294 B2
Daniel  (45) Date of Patent: Sep. 4, 2012

(54) ENCODING OBJECT STATES

(75) Inventor: Maxime Daniel, Besne (FR)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 12/256,688

(22) Filed: Oct. 23, 2008

(65) Prior Publication Data

US 2009/0119687 A1    May 7, 2009

(30) Foreign Application Priority Data

Nov. 7, 2007  (EP) .................................. 07301527

(51) Int. Cl.
    *G06F 7/60*  (2006.01)
    *G06F 3/00*  (2006.01)
    *G06F 3/048*  (2006.01)
    *G06F 9/44*  (2006.01)

(52) U.S. Cl. ............ 719/328; 715/763; 715/762; 703/2; 717/135

(58) Field of Classification Search ........................ None
See application file for complete search history.

(56) References Cited

U.S. PATENT DOCUMENTS

| | | | | |
|---|---|---|---|---|
| 5,179,657 | A * | 1/1993 | Dykstal et al. | ................ 715/762 |
| 8,141,060 | B2 * | 3/2012 | Raghavan et al. | ............ 717/135 |
| 2004/0073413 | A1 * | 4/2004 | Aberg et al. | ...................... 703/2 |
| 2007/0266329 | A1 * | 11/2007 | Gaudette | ....................... 715/763 |

* cited by examiner

*Primary Examiner* — Andy Ho
*Assistant Examiner* — Tuan Dao
(74) *Attorney, Agent, or Firm* — Cuenot, Forsythe & Kim, LLC

(57) ABSTRACT

A method, computer program and system, which, given a set of Boolean state variables, a set of state transitions described as truth tables for the the state variables, a set of initial states (that is states that objects happen to be in when they are brand new or when they are introduced into the system), all established by a natural modeling of the application domain, can derive an encoding that is provably isomorphic to the initial one but smaller, and transitions that match exactly the initial transitions but operating upon the new encoding, without incurring a significant time penalty. This effect is obtained by generating the extensive set of significant states, renumbering those states, then modifying the transitions implementation so as to use the renumbered states in place of the original ones.

7 Claims, 5 Drawing Sheets

ENCODING OBJECT STATES

FIELD OF THE INVENTION

The present invention generally relates to the tracking of object states by a computer; more particularly, the invention aims at optimizing the encoding of the object states to reduce computer resources consumption when tracking object states.

BACKGROUND OF THE INVENTION

An application typically using object states encoding is static analysis of variables in compilers. In this step of static analysis, the compiler validates the code flow by detecting the impossible variable states or transitions in each branch of the code. One other application is inventory management of physical objects such as containers on which are attached Rfids able to record the container's id and states.

Objects states are well represented by a collection of Boolean properties such as a given local variable which can be deemed valued to null, or not, initialized, or not, etc., at a given point in time. Similarly, a container may have different states depending if it is in a warehouse, on board a truck, on board a train, on board a ship, etc. During the life of objects, events drive predictable changes in objects states, called states transitions, that programs must track. Transitions on those states are coded by use of Boolean arithmetic with the usual operands (and, or, not) to implement truth tables. Truth tables typically give, for a given operation, and the entry states of one to many objects, the expected states of the objects after the transition has occurred. Coming back to the example of a variable in a program, when a local variable that is not initialized is assigned a value, it becomes initialized: in other terms, its 'initialized' Boolean property changes from false to true; similarly, with the example of container, when a container is unloaded from a truck into a warehouse, its 'on board truck' property becomes false and its 'in warehouse' property becomes true. The use of Boolean variables is efficient for the storage of states and the computation of states transitions because the underlying technology (memory, buses and processors) uses bits sets, usually grouped by words that comprise 32, 64 or 128 bits, at the very heart of computing and storage systems. Moreover, it implements efficient Boolean operations on those sets.

When the number of objects for which the states must be tracked and computed becomes very large, one encoding technique that is eventually efficient both in terms of space and time is to use a set of large bitfields (each set typically comprised of an array of words), each bitfield coding one of the Boolean properties, and each object being associated to a specific rank within the bitfields. Using the bitwise operators of the used programming language to operate Boolean transformation one word at a time, states transformations can be operated for objects sets instead of demanding for a per object computation. For example, if we take 8 bit long bitfields and associate the lower order bit to object 1, the following bitfield encodes a given Boolean property as being true for object 1, false for object 2, true for object 3, false for others: "0000 0101"

There is a potentially big issue with this approach though. It is very weak at detecting impossible states, that is, states that the objects cannot reach. Taking an obvious example, a variable cannot simultaneously be initialized and not initialized, or a container cannot be at the same time on board a train and on board a ship (whereas it could be on board a truck and on board a ship). If the programmer initially chooses to code the 'initialized' and 'uninitialized' properties into two separate Boolean variables, the fact that those properties are always linked by a negation may go unnoticed for a while. If this remains unnoticed, the encoding will consume one more property than needed per object, resulting into space waste and superfluous calculations. This example is obvious but less obvious examples abound when the state variables number grows. For example, in the container case, 'on board train' and 'on board ship' are negatively correlated, whereas 'on board truck' and 'on board ship' are not.

There is also a considerable amount of prior art work related to the optimization of Boolean multi-variate transformations. For an example, see 'Two-level logic optimization', Coudert et al., 2001 (in IKLUWER INTERNATIONAL SERIES IN ENGINEERING AND COMPUTER SCIENCE SERIES) ([Coudert 2001]). Their main focus is on providing ways to produce near optimal Boolean logic for use in dedicated hardware circuitry. An elaboration of these is very useful in any multi-variate Boolean transformation. These do not fulfill the needs exposed above by themselves though, since they only tackle the reduction of the time needed to implement given truth tables. They do not address the reduction of the number of considered variables. When applied to the initial problem of optimizing object states and transitions, this prior art would deliver a gain in computation time but not in space.

Hence, there is a need for a solution that enables programmers to define states and transitions according to the desired semantics and still implement them in an efficient way in terms of space for encoding them.

A first step in space optimization for encoding object states and transitions has been observed at least in Eclipse, an open source project on the web site http://www.eclipse.org, and more particularly in the class: org.eclipse.jdt.internal.compiler.flow.UnconditionalFlowInfo for the 3.1 version of the product. This implementation uses natural Boolean sets to encode the states of numerous objects in a relatively efficient manner by using bitfield encoding. This implementation adds new functions to the compiler, and drives the number of Boolean properties up, raising concerns about a degradation of performances on time and space. An ad hoc approach enabled the development team to identify some of the unneeded combinations and to re-encode the states by coordinating some Boolean pairs (that is, for example, the meaning of the first bit depends on the value of the second bit).

This proved error prone, gave no warranty regarding optimality of the resulting encoding, and is very inflexible (the addition of a new state variable breaks the encoding). As a consequence, in order to save space and to keep complexity under control, developers cut back on functionalities. In conclusion, bitfield encoding is part of the solution but it is not sufficient for saving space with an important number of objects.

SUMMARY OF THE INVENTION

It is an object of the invention when a model has been defined in an intuitive way for accessing object states and transitions to provide an equivalent access to object states and transitions while making this access more efficient in terms of computer resources.

A first aspect of the present invention provides a method for creating a code implementing an API, wherein a set of objects has been numbered, the API accessing object states and transitions, the method comprising: reading the API and defining a corresponding set of object states expressed by a list of Boolean variables, initial object state values and object states transitions; reading the defined object states, the initial object state values, and transitions and creating a set of corresponding truth tables; reading the created set of truth tables and performing a transitive closure of the starting states providing as a result a list of possible object states among the defined object states; numbering the possible objects states; reading the set of truth tables and, using the numbered possible object states, creating a new set of truth tables; and reading the new set of truth tables and generating code for implementing the transitions by using a bitfield encoding of the numbered objects.

The bitfield encoding of the objects can be performed at any time before execution of step for generating the code.

The step of generating the code can be executed using the [Coudert 2001] algorithm.

A new numbering of the possible object states can be introduced after execution of the computer numbering the possible objects states.

A computing resource cost estimate function can be introduced and used to compute the cost estimate of the generated code. If all the possible numbering are not used, the numbering of the possible objects states can be changed, a new set of truth tables can be created, and code generated. The cost estimate of the generated code can be determined using the cost estimate function such that the generated code corresponds to the best cost estimate.

Before testing if all the numbering functions are used, testing can be done to determine if the end of a defined computing period is reached, and if so, the process ends.

The defining of a set of object states expressed by a list of Boolean variables comprises: defining a set of object states expressed by a list of Integral variable and Boolean variables; and encoding the integral variables of the list into Boolean variables.

Another aspect of the present invention provides a computer program product comprising programming code instructions for executing the steps of the method when the program is executed on a computer.

Another aspect of the present invention provides a system for carrying out the method.

With the solution of the invention object states, transitions, and the function to access the object states and transitions are provided as an initial Finite State Machine which may be implemented as a Java class. The result of the method is an optimized Finite State Machine providing the same function as the initial Finite State Machine but wherein the object states and transitions are encoded in a very efficient manner, and particularly in a reduced space.

A further advantage of the solution is to be compatible with a hardware logic implementation as being based on Boolean variables. For applications that demand extreme performances, transitions can even be implemented as specialized hardware circuitry, which gives the the encoding technique a further advantage.

Typically, the exploration of the needed states and transitions is led by the use of 'natural properties' of the objects. The programmer or analyst in charge of modeling the object states and transitions can create a model by introducing about each state property and each possible transition in a conceptual manner. The initial Finite State Machine is created in an intuitive way matching the application needs. Then, with the use of the method of the invention the resulting Finite State Machine will implement the same function than the initial one and will apply to object states and transactions encoded in a much more efficient way.

The present invention proposes a method that, given a set of Boolean state variables, a set of state transitions described as truth tables for the the state variables, a set of initial states (that is states that objects happen to be in when they are brand new or when they are introduced into the system), all established by a natural modeling of the application domain, can derive an encoding that is provably isomorphic to the initial one but smaller, and transitions that match exactly the initial transitions but operating upon the new encoding, without incurring a significant time penalty. This effect is obtained by generating the extensive set of significant states, renumbering those states, then modifying the transitions implementation so as to use the renumbered states in place of the original ones. If the variables describing an object state are not Boolean, this means that they are expressed by a n-uple of numerated variables, there is always a way to transform them into a set of Boolean variables as explained in FIG. 3, step 310.

In some situations, the invention mail fail to deliver a more efficient encoding than the natural one. We contend that in such cases the natural encoding is close to a near optimal one. This happens when, at the end of execution of Transitive closure (step 320), if the number of elements of the states set can be represented by a binary number which length—defined as its number of bits—is strictly smaller than the number of Boolean variables that describe the objects states, then let NB be the length of the the number, and proceed to the step of numbering the object states; else, the invention cannot be applied and the natural encoding should be considered as a near optimal encoding of the states.

After object state new encoding, the resulting state variables do no more bear any semantics. Which means that modifying any of the states or transitions without performing the complete method of the invention is due to break the program. However, the invention is due to offer smaller encoding, and to avoid many errors induced by wrong assumptions from the programmer about encoding equivalences.

Prior art used for performing the steps of bitfield encoding or the step of generation by [Coudert 2001] of the implementation of the API with the new encoding brings even more efficiency to the method of the invention. An even greater efficiency in terms of use of computer resources is obtained by optimizing the numbering of the object states by the extension of the method with the loop for cost estimate calculation.

DETAILED DESCRIPTION OF THE INVENTION

Figure 1:
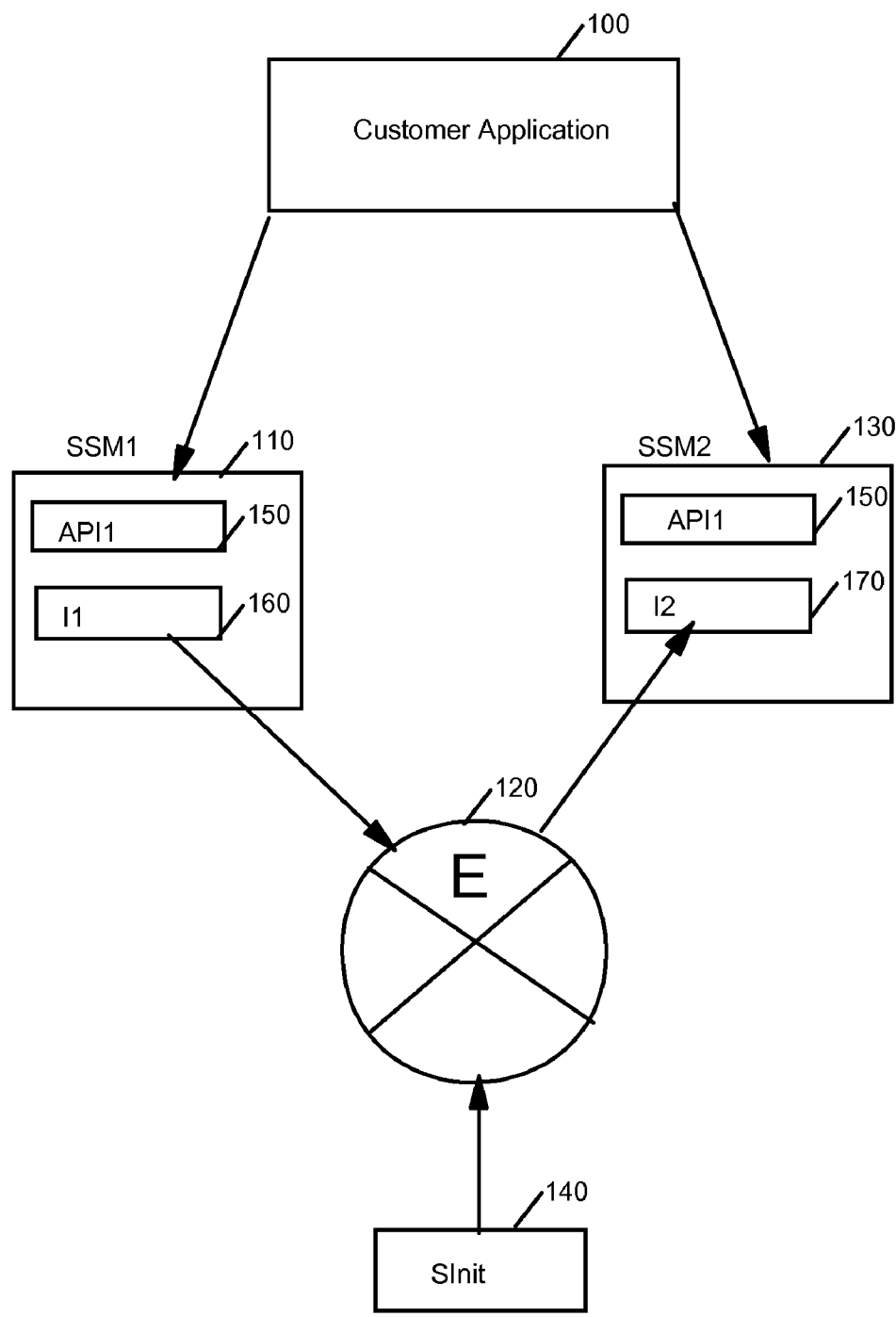
FIG. 1 is a system environment of a method in accordance with an embodiment.

FIG. 1 depicts a system environment of a method in accordance with an embodiment. In FIG. 1 the boxes represent the logical layers which could be implemented as software programs executing on one or more data processing systems. A hardware logic implementation can be also considered.

In the embodiment, a designer who may or not be the same designer who has designed a customer application (100) defines the objects, the objects states and transitions as well as functions to access them in an initial Finite State Machine SSM1 (110). With this initial Finite State Machine SSM1, the customer application performs calls to an API for accessing the object states and transitions. The method of the invention is implemented as a transformation engine E (120) that derives a new Finite State Machine SSM2 (130) from SSM1, taking into account the initial states of objects SInit (140). The new Finite State Machine SSM2 provides the same functions than the initial one SSM1 but in it the object states and transitions are encoded in a very efficient manner. According to the embodiment, the same Application Program Interface API1 (150) used by the customer application to call SSM1 is used to call SSM2. To make the access to SSM1 or SSM2 transparent to the customer application, a distinguishing component I1 (160) in SSM1 and I2 (170) in SSM2 implements the API by SSM1 and by SSM2 respectively.

The transformation engine E (120) provides an automated and reliable means to derive the state machine SSM2 from SSM1. More particularly, it derives from the original implementation I1 of the the API, another implementation I2 that delivers exactly the same function, the I2 implementation being code based, near optimal in space, and efficient in time.

It is noted that the transformation Engine (120) is applied on inputs prepared by a designer reading the API and interpreting the content for listing the object states, the initial object states and the transitions. Also during execution, the Engine uses numbering of objects as defined in the API. As it is described in the rest of the document, more than one Engine can be defined according to improvements brought in the execution of some steps (Use of a prior art [Coudert 2001] algorithm for the minimization of the code that implements the truth tables, choice of the best numbering of object states to provide the best computing resource cost).

Figure 2:
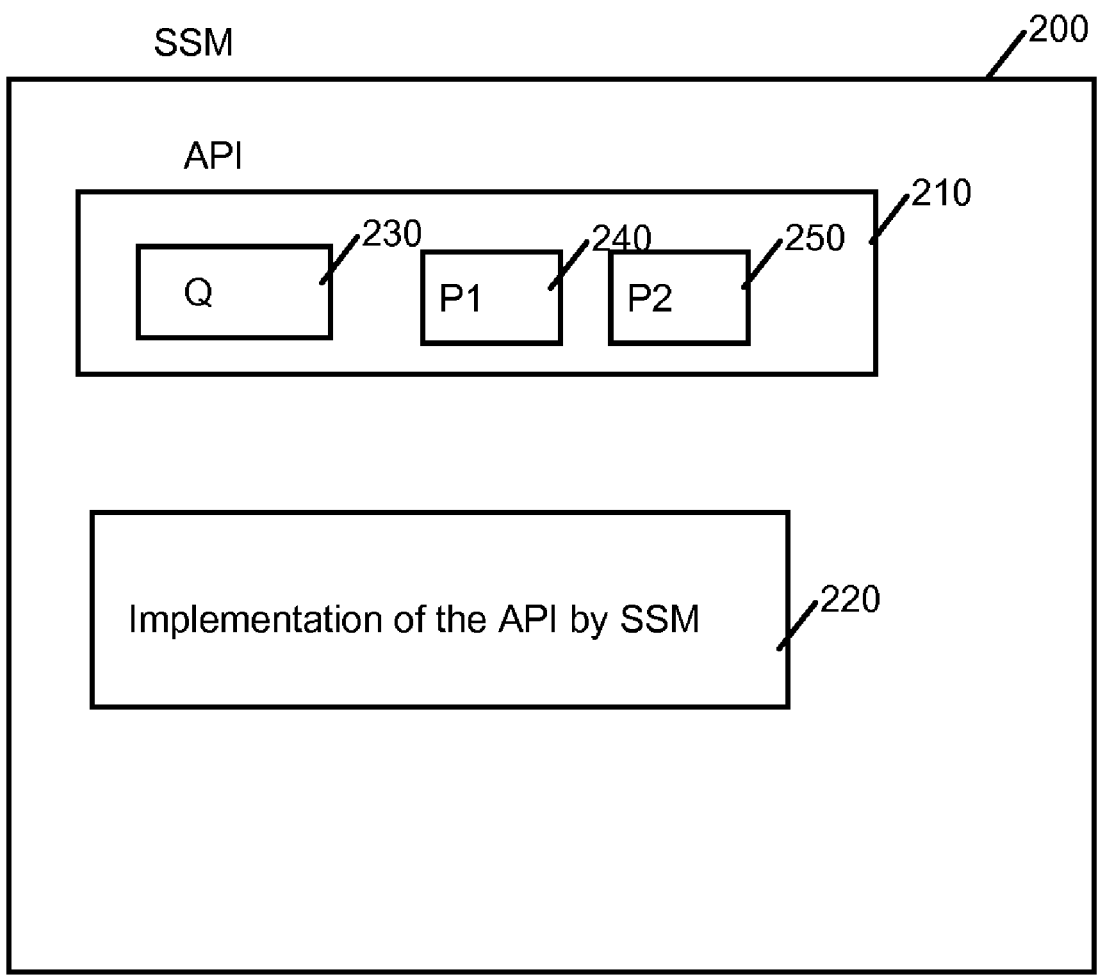
FIG. 2 illustrates a use of a Finite State Machine to implement management of object states and transitions.

FIG. 2 illustrates the use of a Finite State Machine to implement the management of object states and transitions. Such a Finite State Machine is preferably implemented as software, for instance as Java classes, fields and methods.

Such a State Machine comprises a set S of states Si, i taking values from the [1, NS] interval, that describes the states a given object can be in. It comprises also a non-empty subset SInit of S which describes the states an object may be in when entering the system (these are called the initial states; SInit is often a singleton); a set E of events Ei, i taking values for the [1, NE] interval, that describes the events that can be fired upon an object; transitions that each object will undergo as an effect of events, as a projection of the Cartesian product S×E upon S (for each i in [1, NS], each j in [1, NE], the transition defines STij as the state an object would be in after event Ej had been fired upon the the object while it was in state Si).

Continuing with the example of defining Set State Machine starting from states encoded as n-uples of Boolean values, S is then seen as B elevated to power NB, where B has only two elements, known as true and false. Let SBij, i taken from [1, NS], j taken from [1, NB], be the value of the jth Boolean value for state Si. It is noted that state machines implemented by software can always be considered as fulfilling this requirement, because, in the current state of the technology, numbers are stored and computed as bit sets, which can be equated to Boolean Cartesian products.

The simple state machines above, are extended to define transitions as a projection of S×S×E upon S (for each i in [1, NS], each j in [1, NS], each k in [1, NE], STijk defines the state an object would be after event Ek had been fired upon the the object while it was in state Si, under the additional condition that the event Ek would be further parameterized by the state Sj). Typical examples of such extended machines would include cases where events are parameterized by an object instance, potentially distinct from the object upon which the event is fired. In the context of flow analysis, this is what happens when the association of two code paths is computed to determine the downstream state of the considered object.

In the naive implementation of the above State Machine with the Java language, a class would describe objects. Boolean fields of that class would encode the states. Methods of the class would implement reactions to events and effect transitions by modifying the fields. S×E→S transitions would be implemented by such methods that would take no parameter. S×S×E→S transitions would be implemented by such methods taking one instance of the same class as parameter.

According to the embodiment, the state machines as described above are used upon sets of objects, this use being most pertinent when the the sets of objects contain numerous instances. Let O be an ordered set of objects that contains NO objects. The state of O takes its values into S power NO. By extension of the state machines described above, the system will consider a 'state set machine' specified by:

a set Q of queries Qn, n taking values from the [1, NQ] interval, that each, given an object set O, i taken from [1, NO], j taken from [1, NB], can answer SOij defined as the value of the jth Boolean value for the state of the ith object of O; such queries would typically be implemented as methods upon the class of O, taking an integral parameter (the object index) and returning a Boolean value, that would not modify O in any respect; the fact that O holds complete objects or only the representation of their states is unimportant for the invention;

a set P1 of procedures P1n, n taking values from the [1, NP1] interval, that each, given an object set O, i taken from [1, NO], j taken from [1, NE] and such that Ej is an event that is not further specialized by objects states, will apply to Oi, the ith object of O, the effect of event Ej; it is further assumed that the states of Ok for k different from i never affect the result of any of these procedures; such procedures would typically be represented as methods upon the class of O, taking an integral parameter (the object index) and returning nothing, that would only modify the internal representation of Oi's state;

a set P2 of procedures P2n, n taking values from the [1, NP2] interval, that each, given an object set O1, an object set O2, i taken from [1, NE] and such that Ei is an event that is further specialized by an object state, will apply to each object O1j, j from [1, NO] of O1 the effect of Ei further specialized by the value of the object O2j of O2 which as the same index as O1j; it is further assumed that the states of O1k and O2l for k and l different from j never affect the result of these procedures upon Oj when Oj is considered; note that NP1+NP2 equals NE; such procedures would typically be represented as methods upon the class of O, taking an integral parameter (the object index) and an object parameter (O2), and returning nothing, that would only modify the internal representation of O's state; and SInit (140), the set of the initial states of an object of O; the notion of initial state of O itself is not important to the invention (in one other embodiment the State Machine could be defined as SInit power NO, without any condition of correlation between objects); such set would typically be represented by a non empty set containing at most NS instances of the class of O (or a derived class O' holding only one object instead of NO objects).

The association of Q, P1 and P2 constitutes an API (150, 210) that third party code can leverage to signal events to O and measure their effects upon the states of its constituting objects. In a concrete system, an implementation I1 of that API would be provided, that would realize the API. Various techniques of implementation exist for I1, some being entirely code based, that is, only relying on code to define the transitions, others consisting into an interpreter that leverages explicit transition tables stored as data.

The inputs of the transformation engine E (120) of the method of the embodiment are SSM1 Set State Machines comprised of an interface API1 that defines queries (Q), procedures (P1 and P2) as specified above, and the set of initial states SInit as defined above.

Figure 3:
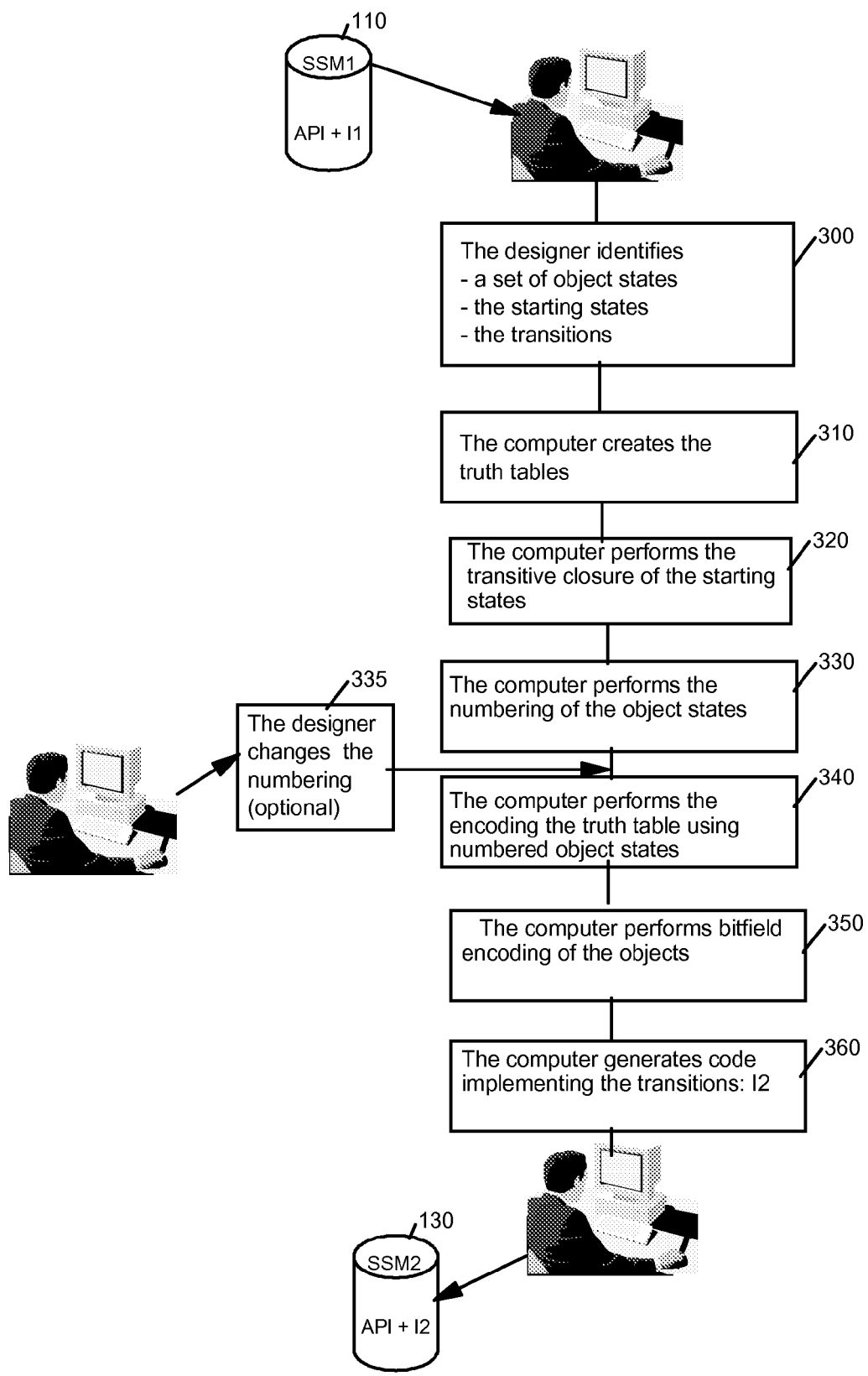
FIG. 3 is a general flowchart of the method in accordance with the embodiment.

FIG. 3 is the general flowchart of the method of the developer embodiment. In an initial step, the customer application has created a Set State Machine SSM1 by developing queries (Q) to objects, and procedures (P1, . . . Pn) corresponding to the customer application needs. It has also developed code (I1) for implementing queries and procedures while manipulating the object states and their state transitions. SSM1, for Set State Machine 1, applies to a collection of objects of a same type. For instance, if the customer application is for managing traveling containers, SSM1 applies to all the traveling containers which all have a same behavior in terms of possible states and state transitions. The flowchart describes the steps of the method for optimizing space for states encoding for a collection of same type of objects.

In a first step (300) a designer identifies by reading the SSM1:
- the natural Boolean variables that describe the object states; this is done by reading the queries Q such as "is the container in the ship?" defining the state "in the ship";
- the set of starting states, comprising at least one element (SInit); and
- the transitions, that is the procedures of I1 that modify object states, and identifying them as P1 (involve one object state and one event) or P2 (involve two object states and one event), etc.

In a second step (310), the computer automatically creates as many truth tables as the number of transitions times the number of Boolean properties. This program executes each procedure upon each state, using the queries to read the resulting state of each computation. For each computation, separating the Boolean properties of the resulting state provides one truth table per Boolean property.

In a third step (320) the computer executes a program for performing the transitive closure of the set of starting states defined in step 300 using the set of truth tables created in the preceding step (310). This program implements algorithms well known from prior art since it was mathematically established, under the graph theory that transitive closure allows converging to a set of reachable graph nodes. The transitive closure allows identifying all the reachable nodes. Applying the graph theory, one can map graph nodes to object states and graph paths to transitions. The list of reachable nodes correspond to the set of states which are related to one or more of the initial states and it is what we want to identify. This known property is interestingly used here in the context of minimizing the object states and transition encoding. The program (320) can be easily written, for instance, from the Floyd-Marshall algorithm referred in the web page http://en.wikipedia.org/wiki/Floyd-Warshall_algorithm. The inputs for this program are the set of starting states defined in step 300 and the set of truth tables created in step 310. The output provides all the possible states that one object can reach starting from the initial states as defined.

It is noted that step 320 for computing transitive closure of initial object states uses as inputs the truth tables as defined in the preceding steps. Truth tables are the easiest way to represent the transitions. As known by the person skilled in the art, any equivalent logical memory representation, such as a graph, of these data could be used as input of a program computing the transitive closure of the initial object states. In the embodiment a truth table representation is used. In the rest of the flowchart describing the method of the embodiment a new set of truth tables is created (340) and used as input to the step for generating code implementing transitions (360). Even if any other representation of transitions could be used the truth tables are preferred because they are easier to leverage in the described algorithms.

At the end of execution of step 320 we have a list of object states which are the only object states that will be used in the following steps of the method. The resulting object states are the 'possible object states', a subset of the input object states. The initial object states and the transitions are the same as the input ones. Then the computer encodes the truth tables by first numbering (330) each state of the object set resulting from the execution of the preceding step (320). The states are numbered with binary numbers, starting at 0; this numbering can be done automatically by the computer at random; any other numbering is possible and the designer could optionally decide to impose a numbering by interrupting (335) the execution by the computer. As explained later in the document in reference with the description of FIG. 4, the choice of how the object states are numbered has an impact on the execution time of the implementation of the API used by the customer application in the final Set State Machine SSM2. With the extension of the method, the numbering can be optimized to reduce processing time.

In step 340 when generating a new set of truth tables, the computer takes into account the numbers assigned to object states in step 330. For each procedure p and each Boolean variable b, a truth table is determined by considering in turn for each state s1 the state s2 resulting of the application of p to s1 as determined in step 310, and then extracting the valuation of b in s2. If the number of bits needed to number the states according to step 320 is k times smaller than the initial number of Boolean variables needed to describe a state, then the new set of truth tables will count k times less tables than the set of truth tables resulting from step 310.

The next step (350) includes performing a bitfield encoding of the set of objects of the collection of objects of a same type for which the states and transitions are considered by the method of the embodiment. The bitfield encoding is automatically performed by the computer on the object states resulting from the execution of the preceding steps. In any case, the bitfield encoding process comprises the following substeps:
- counting the objects of the collection of objects which states must be tracked; let NO be the result;
- giving a distinct number to each object, comprised between 0 inclusive and NO exclusive; and
- allocating NB bitfields, each capable to hold at least NO bits; it is noted that, in an architecture that provides 64 bits integers like Java, if the number of objects is lesser than or equal to 64, 64 bits can be used; if the number of objects is greater than 64 an array needs to be allocated.

The bitfield encoding of the objects will improve the manipulation of objects as memory words by the processor and this will improve processing for accessing object states and transitions.

It is noted that as the bitfield encoding step (350) uses as input the object numbering which is defined at the customer application level, it can be performed at any time before execution of the following step (360) for generating code implementing the transitions even if it immediately precedes the step for generating code in the embodiment.

In the next step (360), the computer automatically generates the I2 program which implements the transitions using one of the methods for implementing transitions described by truth tables well known by the person skilled in the art. Using one of the methods for implementing transitions described by truth tables as described into [Coudert 2001], implies implementing a near optimal transformation routine for each transition.

The method has delivered a new implementation for the transitions (I2), that is efficient in terms of time, and that has saved space. Using the same API1 than with SSM1, the resulting SSM2 Set State Machine comprising the same API1 and the I2 implementation, the same API is provided to the customer application for accessing object states and transitions starting from the same starting states but in an optimized way from a space point of view.

Figure 4A:
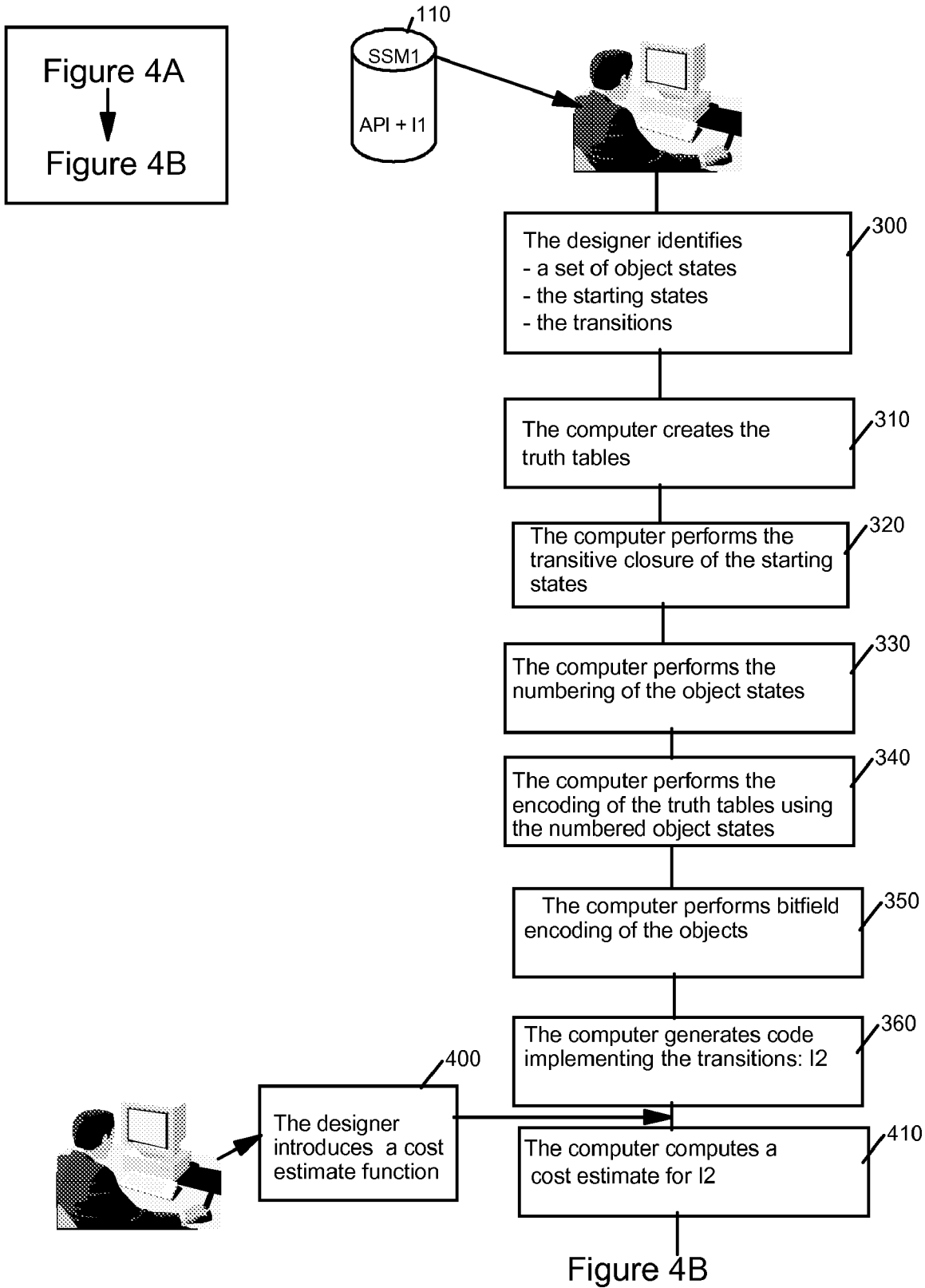
FIG. 4A-4B depict the general flowchart of FIG. 3 extended with steps with computer resource cost estimate computation for improving transition implementation.
Figure 4B:
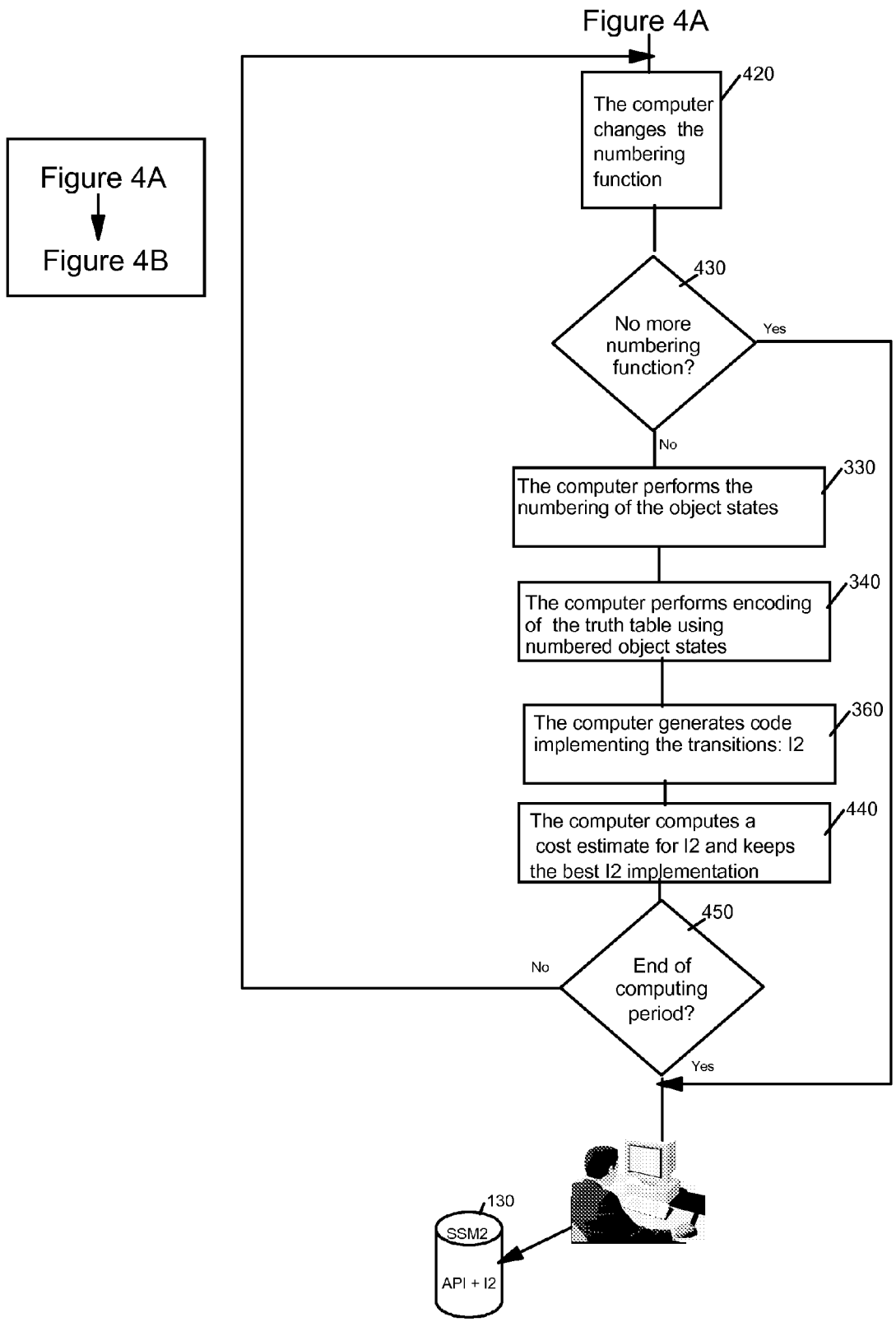

FIG. 4A-4B is the general flowchart of FIG. 3 extended with steps with computer resource cost estimate computation for improving transition implementation (I2). The flowchart in FIG. 4A starts by executing the steps (300, 310, 320, 330, 340, 350) of the method of the embodiment for creating the truth tables corresponding to the objects states, transitions, and starting states identified by the designer up to the generation (360) of code implementing the transitions. Then the designer intervenes at this point of execution of the method to define (400) in the computer a cost function that weights each transformation depending on its relative contribution to the program efficiency in time. Given a (set of) client application(s) (100), the designer gives each query of Q and each procedure of P1 and P2 a weight that represents the relative importance of each of these queries and procedures in the the client applications. The obtained weighting t-uple constitutes a cost function for I2. Typically, the most often a procedure p is called at runtime, the higher its weight in the cost function, and the more important it is to lower p's computational cost, possibly at the expense of other procedures. Other cost functions can be drafted depending on the client application objectives. A new step is added wherein the computer calculates the cost estimate (410) based on the defined cost estimate function (400). In this step (410), the computer rates the I2 routine in the preceding steps in terms of time efficiency; this can be done by counting bitfields operations, or by measuring them at runtime with a profiling tool; with those times and the cost function established in step 400, the computer calculates a total cost for the states numbering at hand.

In FIG. 4B a loop starts on choosing one other possible numbering generated by the computer (answer No to test 430) and performing the following steps of the method (330, 340, 360) for generating the code implementing the transitions on the basis of the same bitfield encoding as chosen once (350) in the execution of the first steps of the method (FIG. 4A). The total cost is computed as described above with the new numbering function and the computer retains the I2 transition implementation that minimizes the total cost (440). The loop can stop if a limit of computing period has been introduced in the computer and is reached (answer Yes to test 450). If no limit has been introduced or if the computing period is not over (answer No to test 450), the loop is re-executed (420, 430, 330, 340, 360, 440, 450) until there is no more numbering to be explored (answer Yes to test 430) or the computing period expires. In such both cases where there is no more numbering to explore (answer Yes to test 430) or the end of (reasonable) processing period is reached (answer Yes to test 450) the last best I2 transition implementation code is retained; the computer has picked up the one that minimizes the total cost computed as described here; the method has delivered the same implementation as at end of the first execution of step 360 in FIG. 4A, but further optimized in time.

It is noted that the technique used to encode the objects states into the bitfields (340) could include, for instance the following: bit n of bitfield p, counting bits from right to left, holds the p-th bit of the state number of variable numbered n. Other encodings are possible (code bits from left to right, etc.), that are compatible with the invention, as long as they do not waste space; the transitions are implemented as bitfields bitwise arithmetic operations; for example, in Java, the logical AND between two bitfields would use the & operator on integer values.

Optimization techniques to implement the transitions (360) as those described by [Coudert 2001] use tri-states truth tables instead of pure Boolean values; this is compatible with the present invention, with a caveat: minimizing the number of necessary bitfields may require that strict Boolean valuation be used while performing the transitive closure of the states set.

Transitive closure computation (320) is a well-know problem and easily coded program.

Costs calculations (410) and code generators (360) to provide the transitions routine do not seem difficult to implement once the needed operations are identified, and the prior art [Coudert 2001] points to additional resources to code a program able to find a near optimal set of operations for each transition.

One example of code based upon an obvious situation would consist first in considering the 'null' and 'not null' natural states coded for eight objects numbered from 0 to 7, into 8 bit words. The initial state of a variable would be (false, true). The interesting transitions would be markAsNull and markAsNonNull. In natural states terms, the implementation (in Java pseudo code) would then be:

```
byte nullState = 0;
byte notNullState = OxFF;
markAsNull(int n) { /* n is the number of the considered
        object */
    byte mask = 1 << n;
    nullState |= mask;
    notNullState &= ~mask;
}
markAsNotNull(int n) { /* n is the number of the considered
        object */
    byte mask = 1 << n;
    notNullState |= mask;
    nullState &= ~mask;
}
``` truth table for markAsNull and null is:

|  |  | not null true false |
|---|---|---|
| null | true | true true |
|  | false | true true | truth table for markAsNull and not null is:

|  |  | not null true false |
|---|---|---|
| null | true | false false |
|  | false | false false | truth table for markAsNotNull and not null is:

|      |       | not null   |
|      |       | true false |
| null | true  | true true  |
|      | false | true true  | truth table for markAsNotNull and null is:

|      |       | not null    |
|      |       | true false  |
| null | true  | false false |
|      | false | false false |

The transitive closure starting with (false, true) gives a set of two states:

| (false, true) numbered 0 |
| (true, false) numbered 1 |

We only need one variable to hold the resulting states: byte state=0; // initial value
The resulting truth table for markAsNull and null is:

| null | true true  |
|      | false true |

The resulting truth table for markAsNotNull and null is:

| null | true false  |
|      | false false |

This simplistic example happens to keep one of the existing Boolean variables as the only needed one; more elaborate situations would typically lead to a new set of Boolean variables of which few if any would equate a variable of the initial set.)
And the transitions can be re-encoded as:

```
markAsNull(int n) { /* n is the number of the considered
        object */
    state |= 1 << n;
}
markAsNotNull(int n) { /* n is the number of the considered
        object */
    state &= ~(1 << n);
}
```
This saves one byte, three bitwise operations (one ~, one &, one |) and four assignments.

In the embodiment, the object states are expressed as a combination, a n-uple, of a fixed number of Boolean values. The objects states are represented as an element of a Cartesian product of Boolean variables. In the case where the natural encoding of object states is an element of the Cartesian product of variables that are each valued into sets of more than two values instead of Boolean variables, the invention still applies, because each of the the variables can be coded upon a Cartesian product of Boolean variables. More specifically, given a state representation $V1XV2X \ldots Vn$ of states in SSM1, step (310) for creation of truth tables would be modified as follows. For each Vi, let NVi be the number of values it can take, and NBVi be the minimal number of bits needed to store the binary representation of NVi. For each i, step 310 would number each value of Vi as a distinct valuation in the Cartesian product of Boolean variables $bi1Xbi2X \ldots biNBVi$, then proceed normally upon the representation resulting from the substitution in $V1XV2X \ldots Vn$ of each Vi by its $bi1Xbi2X \ldots biNBVi$ equivalent, $b11Xb12X \ldots b1NBV1Xb21X \ldots bnNBVn$, which is itself a Cartesian product of Boolean variables. We returned to the previous in which the objects states are expressed as elements of a Cartesian product of Boolean variables.

The invention claimed is:

1. A method for creating a code implementing an application programming interface (API), wherein a set of objects has been numbered, the API accessing object states and transitions, comprising:
   reading the API and defining a corresponding set of object states expressed by a list of Boolean variables, initial object state values and object states transitions;
   reading the defined object states, the initial object state values and transitions and creating a set of corresponding truth tables;
   reading the created set of truth tables and performing a transitive closure of the starting states providing as a result a list of possible object states among the defined object states;
   numbering the possible objects states;
   reading the set of truth tables and, using the numbered possible object states, creating a new set of truth tables; and
   reading the new set of truth tables and generating code for implementing the transitions by using a bitfield encoding of the numbered objects.

2. The method of claim 1, wherein the bitfield encoding of the objects is performed at any time before execution of the step of generating the code.

3. The method of claim 1, wherein the step for generating the code is executed using a Coudert algorithm.

4. The method of claim 1, wherein a new numbering of the possible object states is introduced after the numbering of the possible objects states.

5. The method of claim 1 further comprising:
   introducing a computing resource cost estimate function;
   using the cost estimate function to compute the cost estimate of the generated code;
   if all possible numberings are not used, changing the numbering of the possible objects states;
   re-executing the steps for creating a new set of truth tables and generating code;
   computing the cost estimate of the generated code using the cost estimate function; and
   keeping the generated code corresponding to the best cost estimate.

6. The method of claim 5, further comprising:
   before testing if all the numbering functions are used, testing if an end of a defined computing period is reached; and,
   ending the method if the end of the defined computing period is reached.

7. The method of claim 1, wherein the step of defining a set of object states expressed by a list of Boolean variables comprises:
   defining a set of object states expressed by a list of Integral variable and Boolean variables; and
   encoding the integral variables of the list into Boolean variables.

* * * * *